Feb. 10, 1970     F. W. FORK     3,494,381
CONNECTING MEANS FOR TRENCH COVER PLATES
Filed April 6, 1966     2 Sheets-Sheet 1
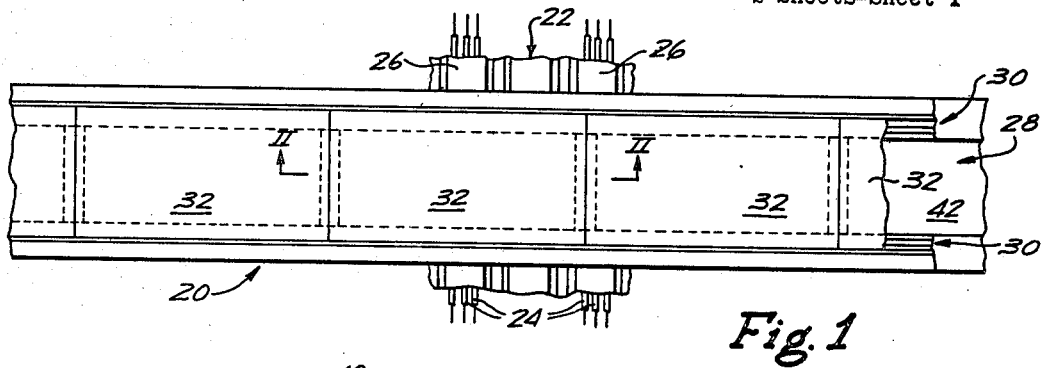
Fig. 1
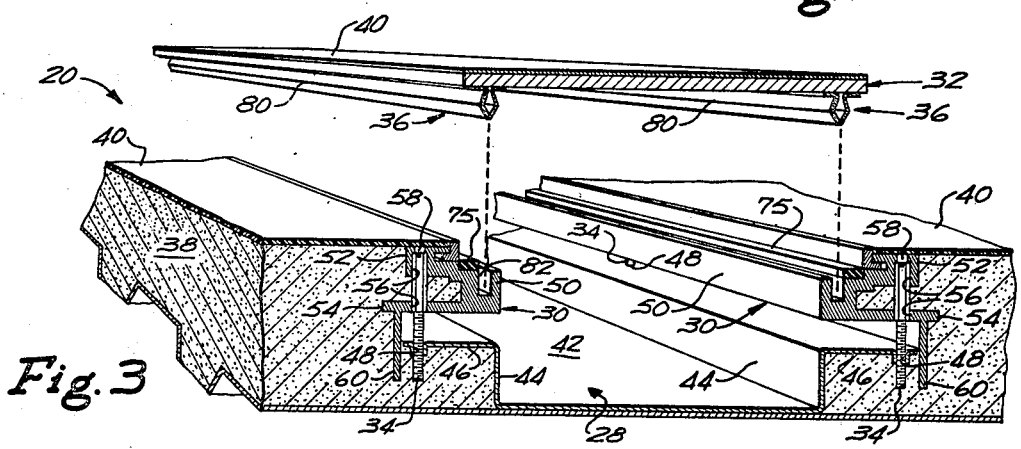
Fig. 3
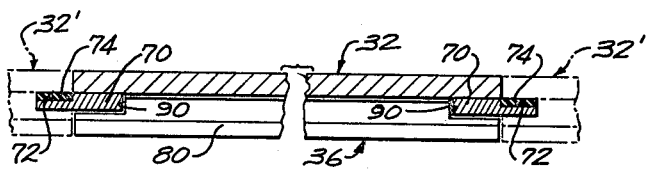
Fig. 2
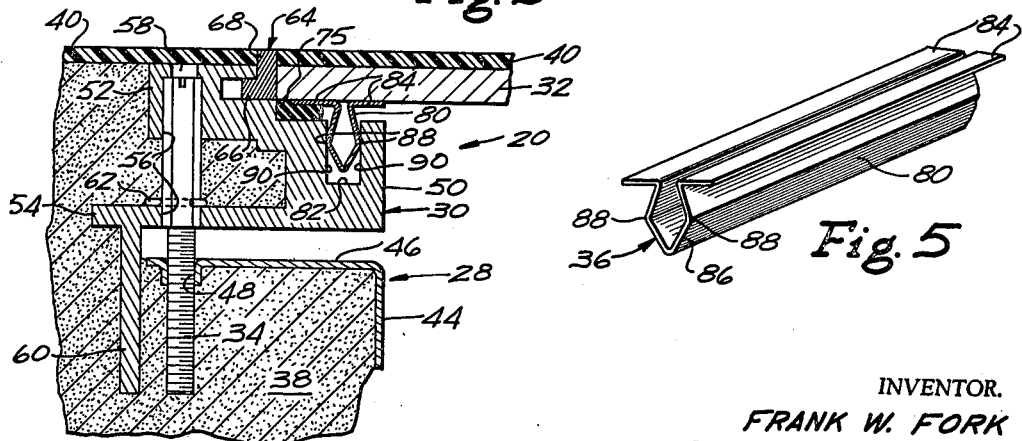
Fig. 4
Fig. 5
INVENTOR.
FRANK W. FORK
BY Harry B. Keck
ATTORNEY

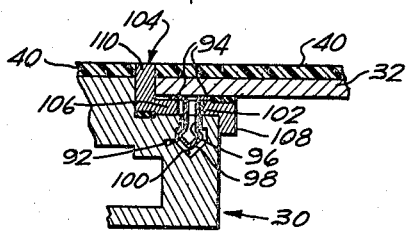
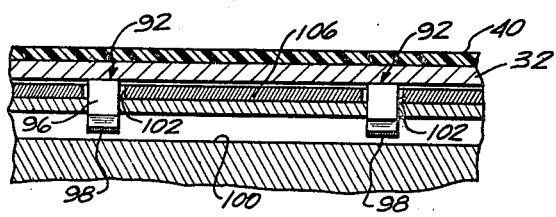
Fig. 6  Fig. 7
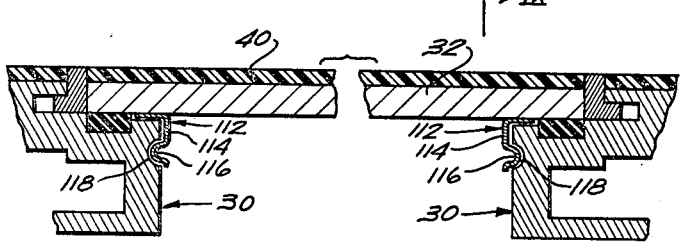
Fig. 8
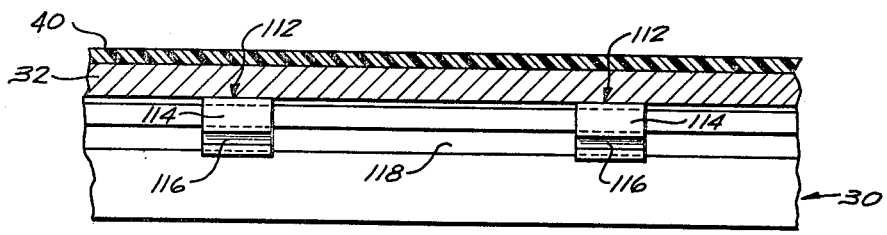
Fig. 9
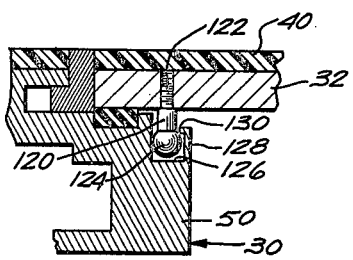
Fig. 10
INVENTOR.
FRANK W. FORK
BY Harry B. Keck
ATTORNEY

United States Patent Office 3,494,381
Patented Feb. 10, 1970

3,494,381
CONNECTING MEANS FOR TRENCH COVER PLATES
Frank W. Fork, Allison Park, Pa., assignor to H. H. Robertson Company, Pittsburgh, Pa., a corporation of Pennsylvania
Filed Apr. 6, 1966, Ser. No. 540,686
Int. Cl. H02g 3/28; E04f 19/08; E04b 5/48
U.S. Cl. 138—92                              8 Claims

ABSTRACT OF THE DISCLOSURE

An electrical trench assembly having a base pan and vertically adjustable side rails. Said side rails being secured to and carried by said base pan by means of adjusting screws, which are carried by said rails and which screw into threaded connections on said pan. The cover plate for the trench assembly is attached to the side rails by resilient fasteners.

---

This invention relates to trench assemblies of the type having cover plates detachably connected to subjacent supporting members, and more particularly to improvements in means for detachably connecting said cover plates to said supporting members.

Various trench assemblies are shown in the prior art. See, for example, U.S. Patents 3,084,480, 3,204,378, 3,101,097 and 3,237,356. These trench assemblies may be installed in those building floors incorporating metal cellular flooring. The trench assemblies cooperate with the metal cellular flooring to provide a complete distribution system for distributing electrical power and communication wiring, fluid and gas-carrying conduits and the like, throughout the entire floor area. The trench assemblies may also be installed in building floors of the reinforced concrete type which do not incorporate metal cellular flooring.

The trench assemblies provide an electrical conductor carrying channel of great capacity. Accessibility to the interior of the trench assembly is essential to accommodate frequent alterations in the use of electrical energy. Accordingly, all trench assemblies are provided with removable cover plates. The cover plates have heretofore been secured by means of fasteners passing through the top of the cover plate into engagement with subjacent trench elements. The fasteners are normally located along the edges of the cover members. The heads of the fasteners are exposed to facilitate removal of the cover plates when desired.

In modern building floor constructions, a decorative coating is normally applied over the exposed floor surface, for example, linoleum, asphalt tile, rubber tile, ceramic tile, carpeting and the like. The decorative coating is also applied over the cover plates of the trench assembly to blend the cover plates with the remaining floor area.

Inasmuch as the fasteners must be exposed, holes are cut in the decorative coating to receive the heads of the fasteners. Since the fasteners are located close to the edges of the cover members, those small segments of the decorative coating lying between the fasteners and the edges of the cover members, are subject to damage. That is to say, these small segments tend to break away with the result that the decorative coating is damaged in the area of the trench assembly. These small segments cannot be conveniently replaced and, therefore, replacement of the entire decorative coating square is necessary.

In all modern trench assemblies, the edges of the cover plates are supported by longitudinal members which, in turn, are supported on a subjacent base or pan member by means of height adjusting or leveling screws The overall arrangement was such that the elevation of the cover plates and the longitudinal members above the pan member were adjustable so that the top face of the cover plates was positioned flush with the intended level of the concrete floor. Heretofore, it was essential that the cover plates be secured to the longitudinal members in order that the base member, the longitudinal members and the cover plates remained connected and comprised a unitary subassembly.

OBJECTS

Accordingly, as an overall object, the present invention seeks to provide novel means for holding down the cover plates in vertical adjustable trench assemblies, which holddown means eliminates the need of fasteners.

Another object of the invention is to provide novel hold-down means which is completely hidden from view.

Still another object of the invention is to provide novel hold-down means for trench assembly cover plates, wherein the decorative coating applied to the cover plates is not subject to the cracking problem described above.

A further object of the invention is to provide holddown means for cover plates wherein sealing of the trench assembly is retained.

STATEMENT OF INVENTION

Trench assemblies of the type described herein, comprise, in part, a pair of laterally-spaced longitudinal members supported in the floor and generally rectangular cover plates each of which extends between the longitudinal members. Each of the longitudinal members has a ledge or shoulder which receives an edge of the cover plates to support the same. Normally, a strip of sealing material is provided between the cover plates and the shoulders to prevent ingress of liquids, dust and like, into the interior of the trench.

In accordance with the present invention, novel means is provided for detachably connecting the cover plates to the longitudinal members. The connecting means are connected to the lower face of the cover plates and extend therefrom toward the longitudinal members. The connecting means, accordingly, are disposed entirely below the uppermost face of the cover plates and are, therefore, completely hidden from view.

In accordance with the preferred embodiment of the invention, the connecting means comprise flexible elements connected to and extending from the cover plates. The flexible elements have at least a resilient portion which is biased into frictional engagement with an end of the longitudinal members. The flexible elements may extend continuously along the length of the cover plates. Alternatively, the flexible elements may comprise a plurality of individual elements secured at spaced locations along the length of the cover plates. The flexible elements are preferably formed from spring steel and are shaped to provide a resilient portion which is biased toward the longitudinal member.

In accordance with an alternative embodiment of the invention, the connecting means comprise a plurality of pin members secured to and extending from the lower face of the cover plates. The pin members are positioned to enter grooves provided in the longitudinal members. The grooves are defined, in part, by a deflectable wall portion of the longitudinal members whereby connection and disconnection of the cover members is readily accomplished.

The above and other objects and advantages of the present invention will become apparent from the following detailed description by reference to the accompanying drawings, in which:

FIG. 1 is a plan view of a trench assembly installed on metal cellular flooring and provided with the connecting means of the invention;

FIG. 2 is a cross-sectional view, taken along the line II—II of FIG. 1, illustrating a cover plate provided with the connecting means of the invention;

FIG. 3 is a fragmentary perspective view, in exploded form, illustrating the preferred embodiment of the present cover plate connecting means;

FIG. 4 is a cross-sectional view of one side of the trench assembly of FIG. 3, illustrating a cover plate detachably connected to a longitudinal member;

FIG. 5 is a fragmentary isometric view of the connecting means employed in FIG. 3;

FIG. 6 is a fragmentary cross-sectional view, similar to FIG. 4, illustrating an alternative embodiment of the connecting means of the present invention;

FIG. 7 is a cross-sectional view, taken along the line VII—VII of FIG. 6;

FIG. 8 is a cross-sectional view, taken transversely through the present trench assembly, and illustrating a further alternative embodiment of the present connecting means;

FIG. 9 is a cross-sectional view, taken along the line IX—IX of FIG. 8; and

FIG. 10 is a fragmentary cross-sectional view, similar to FIG. 4, illustrating an alternative embodiment of the present connecting means.

GENERAL DESCRIPTION

Reference is now directed to FIG. 1 wherein there is illustrated a trench assembly 20 in association with metal cellular flooring 22. The metal cellular flooring 22 serves as conduits for electrical cables 24. The trench assembly 20 serves as a major feeding conduit for the electrical cables which pass through corresponding openings (not shown) in the base of the trench and the upper surfaces 26 of the metal cellular flooring 22.

Referring now to FIGS. 1, 2 and 3, the present trench assembly 20 comprises an essentially U-shaped channel 28, a pair of longitudinal members 30, a plurality of cover plates 32, a plurality of leveling screws 34, and connecting means 36 of the invention. As can best be seen in FIG. 3, concrete 38 is poured over the metal cellular flooring 22 and about the U-shaped channel 28 and the longitudinal members 30 to serve as a rigid floor for the resulting building. Normally, a decorative coating 40 is provided above the concrete 38 and the cover plates 32, for example, linoleum, asphalt tile, rubber tile, ceramic tile, carpeting and the like.

A complete description of the preferred and alternative arrangements of the channel 28, the longitudinal members 30 and the leveling screws 34 will be found in my copending U.S. patent application Ser. No. 530,464, filed Feb. 28, 1966, now Patent No. 3,368,311, and assigned to the assignee of the present invention and now U.S. Patent 3,368,311. However, for the purposes of the present invention it is believed sufficient to state that the U-shaped channel 28 has a horizontal web or base 42 which rests upon the upper surfaces 26 of the metal cellular flooring 22. Vertical leg members 44 extend from the edges of the web 42 and terminate in generally horizontal flanges 46. A plurality of spaced threaded openings 48 is provided in the horizontal flanges 46 for threadedly receiving the leveling screws 34. The U-shaped channel 28 is formed from metal such as steel sheets of thickness from about 12 gauge to about 24 gauge.

The longitudinal members 30 comprise a vertical web 50 which connects corresponding ends of upper and lower horizontal arms 52, 54. The upper and lower horizontal arms 52, 54 are provided with a plurality of aligned vertical openings 56 which receive the unthreaded portion of the leveling screws 34. Access openings 58 in the upper horizontal arm 52 provide access to the slotted head of the leveling screws 34 for rotating the same. The lower horizontal arms 54 are provided with vertical flanges 60 depending therefrom past the outer edges of the horizontal flanges 46. The vertical flanges 60 prevent ingress of wet poured concrete into the interior of the trench assembly 20 and also anchor the members 30 in the concrete 38.

Retaining means such as a cotter pin 62 extends through the leveling screw 34 at a location above the lower horizontal arm 54. The cotter pin 62 rotatably confines the leveling screw 34 within the vertical openings 56. It should be evident that by turning the leveling screws 34, the longitudinal members 30 may be elevated such that their uppermost surface is flush with the intended level of the subsequently poured concrete 38, and such that the longitudinal members 30 may be positioned substantially horizontally.

In contrast with the prior art, the leveling screws 34 serve as adjustable securing elements and not only support the longitudinal members 30 above the horizontal flanges 46 but also connect the longitudinal members 30 to the horizontal flanges 46. Consequently, the channel 28 and the longitudinal members 30 comprise a unitary subassembly even when the cover plates 32 are removed. This unique property of the trench assembly 20 is achieved as a result of positioning the leveling screws 34 outwardly beyond the edges of the cover plates 32 in a manner which has not heretofore been presented in the prior art.

The trench assembly 20 is also provided with a tile-stop 64 which, as can be seen in FIG. 4, has a generally L-shaped configuration including a short leg 66 and a long leg 68. The tile-stop 64 is arranged such that when the short leg 66 is positioned vertically, its uppermost surface is flush with the uppermost surfaces of the cover plate 32 and the upper horizontal arm 52 so that it does not interfere with the leveling of the concrete 38. However, when the long leg 68 is positioned vertically, as shown in FIG. 4, it projects above the uppermost surfaces of the cover plate 32 and upper horizontal arm 52 to serve as a divider for the decorative coating 40.

Referring now to FIG. 2, certain of the cover plates 32 have plates 70 secured to the undersurface thereof and which project therefrom to provide a surface 72 for receiving a strip of sealing material 74. The arrangement is such that the adjacent cover plates, indicated herein by the numeral 32', will overlie the sealing material 74 to prevent ingress of dust, liquids and the like into the interior of the trench assembly. As can be seen in FIG. 3, similar strips of sealing material 75 are applied to the longitudinal members 30 and are positioned to be engaged by the longitudinal edges of the cover plates 32, thereby providing a seal completely around the periphery of each of the cover plates 32.

CONNECTING MEANS 36

The preferred embodiment of the connecting means of the invention is illustrated in FIGS. 2–5 inclusive. The connecting means 36 comprises flexible elements 80 depending from the opposite sides of the cover plate 32 and positioned to enter lengthwise recesses 82 provided in each of the longitudinal members 30.

As can best be seen in FIG. 5, each of the flexible elements 80 comprises a spring member having oppositely extended flanges 84 which are secured, as by spot welding, to the lower face of the cover plate 32, and an intermediate body portion 86 having a generally diamond-shaped configuration. The intermediate body portion 86 includes oppositely presented ridges 88 adapted to frictionally engage vertical surfaces 90 of the lengthwise recesses 82, as shown in FIG. 4. The oppositely presented ridges 88 are, of course, displaced toward each other when the flexible element 80 is inserted into the lengthwise recess 82. As can be seen in FIGS. 2 and 3, the flexible elements 80 preferably extend continuously along the entire length of the cover plates 32.

It should be noted at this time that the flexible elements 80 reside entirely below the upper surface of the cover plates 32. Therefore, when the cover plates 32 are installed in the trench assembly 20, the flexible elements 80 will be entirely hidden from view. It should also be noted that the decorative coating 40 may be applied to the upper surface of the cover plates 32 without first providing screw-receiving openings as required in the prior art trench assemblies. Consequently, the decorative coating 40 remains intact and is not subject to the cracking tendencies described above.

As can be seen in FIG. 2, each of the flexible elements 80 may be notched, as at 90, so that the plates 70 may extend continuously across the cover plate 32. In this manner, the flexible elements 80 do not interfere with the seal provided by the strips of sealing material 75.

To install the cover plate 32, the cover member is merely laid across the longitudinal members 30, in a conventional manner, and then forced downwardly so that the flexible elements 80 are forced into the lengthwise recesses 82. In this manner, the cover plate 32 is detachably connected to the longitudinal members 30. Removal of the cover plates 32 may easily be accomplished with the aid of a conventional suction cup.

ALTERNATIVE EMBODIMENTS

Alternative embodiments of the present connecting means will not be described with reference to FIGS. 6-10 inclusive. Corresponding numerals will be employed to identify corresponding parts heretofore described.

Referring now to FIGS. 6 and 7, an alternative embodiment of the connecting means is shown comprising a plurality of flexible elements 92 each having oppositely extended flanges 94 secured, as by spot welding, to the lower face of the cover plate 32 and an intermediate body 96 including a bead-like portion 98 frictionally engaged in a lengthwise recess 100 provided in the longitudinal member 30.

In this arrangement, the flexible element 92 extends downwardly through clearance openings 102 provided in a Z-shaped tile-stop element 104, of the type shown in U.S. Patent 3,237,356. The tile-stop element 104 comprises a central horizontal body 106 having oppositely extending short and long lips 108, 110 respectively along its opposite edges. As can be seen in FIG. 6, the long lip 110 projects above the uppermost surfaces of the longitudinal member 30 and the cover plate 32 and serves as a divider for the decorative coating 40. The tile-stop element 104 may be rotated about its longitudinal axis so that the short lip 108 is positioned vertically. The short lip 108 terminates at substantially the same level as the uppermost surfaces of the longitudinal member 30 and the cover plate 32. Consequently, the short lip 108 does not interfere with the leveling of the concrete.

In this embodiment, the flexible elements 92 serve not only to detachably connect the cover plate 32 to the longitudinal member 30 but also serve to maintain the tile-stop elements 104 in a fixed position relative to the longitudinal member 30.

Referring now to FIGS. 8 and 9, a further alternative connecting means is shown comprising a plurality of flexible elements 112 secured at spaced locations along the length of the cover plate 32. Each of the flexible elements 112 includes a vertical leg 114 terminating in an arcuate rib 116 which projects into a lengthwise groove 118 formed in the vertical web 50 of the longitudinal members 30. As best shown in FIG. 8, the flexible elements 112 along one edge of the cover plate 32 cooperate with the flexible elements 112 along the opposite edge of the cover plate 32 to frictionally and detachably connect the cover plate 32 to the longitudinal members 30. The flexible elements 112 may be disposed directly opposite one another or may be staggered along the length of the cover plates 32.

Referring now to FIG. 10, a further alternative connecting means is shown comprising a plurality of pins 120 (only one shown) which are preferably formed from steel and which are secured at spaced locations along the length of the cover plate 32. The pin 120 includes a first end 122 which is threadedly engaged or otherwise secured to the cover plate 32 and a second end or ball 124 which is positioned to be received in a lengthwise groove provided in the vertical web 50 of the longitudinal member 30. The lengthwise groove is defined, in part, by a thin vertical wall 128 having a shoulder 130 along its upper inner edge. The arrangement is such that the vertical wall 128 will be deflected by the ball 124 when the ball 124 is being inserted into or being withdrawn from the lengthwise groove 126.

SUMMARY

According to the foregoing description, the present connecting means permits the cover plates to be removed without first requiring removal or loosening of fasteners as is required in prior art. Furthermore, the present connecting means resides entirely below the cover plates and is completely hidden from view. A trench assembly provided with the present connecting means will have no exposed fasteners and, therefore, the cover plates thereof will blend completely with the remaining floor area. It should also be apparent that the decorative coating may now be applied without first providing the plurality of openings heretofore required. Consequently, the decorative coating may be applied directly to the cover plates and is not subject to the damage described above. Inasmuch as there are no exposed fasteners, unauthorized persons will not readily comprehend how the cover plates are raised. Therefore, unauthorized entry into the trench assembly is intrinsically discouraged.

I claim as my invention:

1. In a trench assembly adapted to be embedded in a concrete floor structure, the combination comprising:
   generally rectangular aligned abutting cover plates;
   longitudinal members positioned along the opposite sides of said cover plates for supporting the side edges thereof;
   a base member disposed beneath said cover plates, said base member including a central web and laterally extended support flanges at a level above said web, one of said support flanges being positioned beneath each of said longitudinal members;
   adjusting means for individually adjusting the level of said longitudinal members above said support flanges, said adjusting means comprising adjustable securing elements which secure said longitudinal members to said base member to provide a unitary subassembly; and
   connecting means for detachably connecting said cover plates to said longitudinal members, comprising:
      first elements secured to and depending from said cover plates toward said longitudinal members;
      wall elements on said longitudinal members having surfaces engaged by said first elements; and one of said elements having resilient portions which are deflected by the passage of the other of said elements to provide a resilient connection between said cover plates and said longitudinal members.

2. The combination as defined in claim 1 wherein said first elements comprise a spring member having at least one flexible side, said side being deflected to provide a frictional engagement between said cover plates and said longitudinal members.

3. The combination as defined in claim 2 wherein said spring members extend continuously along the length of said cover plates.

4. The combination as defined in claim 2 wherein a plurality of said flexible elements is secured at spaced locations along the length of said cover plates.

5. The combination as defined in claim 2 wherein each spring member includes a pair of opposed flexible walls received between adjacent ones of said wall elements and engaged with the said surfaces thereof.

6. The combination as defined in claim 1 wherein said first elements comprise a spring member depending from said cover plates and having a rib formed in its lower end, and wherein the said surface engaged by said spring member has a groove shaped to correspond generally with the shape of said rib, whereby said rib projects into said groove to retain said cover plates.

7. The combination as defined in claim 1 wherein said first elements comprise a plurality of pins secured to and depending from said cover plates, said pins having enlarged ends remote from said cover plates, and wherein an adjacent pair of said wall elements provide a groove receiving said pins, one wall element of said pair of adjacent wall elements having a lip at its upper end restricting the entrance to said groove, one wall element of said pair of adjacent wall elements being flexible and thereby deflecting by the passage of said enlarged ends into and out of said groove.

8. In a trench assembly adapted to be embedded in a concrete floor structure, including a base pan having a central web and laterally extended support flanges at a level above said central web, vertically adjustable side rails, one positioned above each of said support flanges and secured thereto by vertically presented adjustable leveling screws, said side rails presenting opposed vertical walls, a cover plate positioned above the base pan and spanning the distance between the side rails, the improvement comprising:

resilient means secured to said cover plate and engaged with opposed vertical walls of said side rails for retaining said cover plate connected to and engaged with said side rails.

References Cited

UNITED STATES PATENTS

| | | | |
|---|---|---|---|
| 3,084,480 | 4/1963 | Fork | 138—103 X |
| 3,101,097 | 8/1963 | Murray | 138—92 |
| 1,189,208 | 6/1916 | Hodkinson | 138—157 |
| 2,043,865 | 6/1936 | Place | 174—66 |
| 2,749,381 | 6/1956 | Farish | 174—66 X |
| 3,074,208 | 1/1963 | Seidel | 138—159 X |
| 3,229,029 | 1/1966 | Weiss | 174—68 X |

FOREIGN PATENTS

| | | |
|---|---|---|
| 257,319 | 2/1965 | Australia. |
| 854,137 | 4/1940 | France. |
| 109,250 | 12/1939 | Australia. |
| 1,045,430 | 11/1953 | France. |
| 1,009,092 | 11/1965 | Great Britain. |

LAVERNE D. GEIGER, Primary Examiner

E. J. EARLS, Assistant Examiner

U.S. Cl. X.R.

52—221; 138—103, 157; 174—101